US006509300B1

(12) United States Patent
Gupta

(10) Patent No.: US 6,509,300 B1
(45) Date of Patent: Jan. 21, 2003

(54) LIQUID $CO_2$/HYDROCARBON OIL EMULSION FRACTURING SYSTEM

(75) Inventor: D. V. Satyanarayana Gupta, Calgary (CA)

(73) Assignee: B.J Services Company, Houston, TX (US)

(*) Notice: Subject to any disclaimer, the term of this patent is extended or adjusted under 35 U.S.C. 154(b) by 0 days.

(21) Appl. No.: 09/469,428

(22) Filed: Dec. 23, 1999

(30) Foreign Application Priority Data

Dec. 24, 1998 (CA) .............................. 2257028

(51) Int. Cl.$^7$ .............................. C09K 3/00; E21B 43/26
(52) U.S. Cl. .................. 507/203; 507/202; 507/205; 507/922; 166/308; 519/9
(58) Field of Search .............................. 507/102, 202, 507/103, 203, 205, 922; 166/308; 516/9

(56) References Cited

U.S. PATENT DOCUMENTS

| 3,310,112 A | | 3/1967 | Nielsen et al. | |
| 3,356,138 A | * | 12/1967 | Davis, Jr. | 507/202 |
| 3,368,627 A | | 2/1968 | Hurst et al. | |
| 3,396,107 A | * | 8/1968 | Hill | 507/202 |
| 3,623,552 A | | 11/1971 | Vairogs | |
| 3,664,422 A | * | 5/1972 | Bullen | 166/308 |
| 3,765,488 A | | 10/1973 | Pence | |
| 3,842,910 A | | 10/1974 | Zingg et al. | |
| 3,954,626 A | | 5/1976 | Greminger, Jr. et al. | |
| 4,233,165 A | | 11/1980 | Salathiel et al. | 252/8.55 R |
| 4,519,455 A | | 5/1985 | Holtmyer et al. | |
| 4,554,082 A | * | 11/1985 | Holtmyer et al. | 507/922 |
| 4,627,495 A | * | 12/1986 | Harris et al. | 166/308 |
| 4,825,952 A | * | 5/1989 | Mzik | 166/308 |
| 4,921,635 A | * | 5/1990 | Enick | 507/922 |
| 5,424,285 A | * | 6/1995 | Stacy et al. | 507/202 |
| 5,499,679 A | * | 3/1996 | Loree | 166/308 |
| 5,515,923 A | * | 5/1996 | Loree | 166/308 |
| 5,558,160 A | * | 9/1996 | Tudor | 166/308 |
| 5,589,105 A | * | 12/1996 | DeSimone | 516/9 |
| 5,883,053 A | * | 3/1999 | Tudor | 507/922 |

FOREIGN PATENT DOCUMENTS

| CA | 1301443 | | 5/1992 |
| EP | 695852 | * | 6/1996 |

OTHER PUBLICATIONS

Sinclair, A. Richard et al., "Polymer Emulsion Fracturing," SPIE Jul. 30, 1973; revised manuscript received Apr. 2, 1974 (SPE 4675), presented at SPE–AIME 48th Annual Fall Meeting, Las Vegas, NV, Sep. 30–Oct. 3, 1973.

Blauer, R.E. et al., Rheological and Physical Differences between Foam and Emulsion Fracturing Fluids, presented at Society of Petroleum Engineers 63rd Annual Technical Conference and Exhibition of the Society of Petroleum Engineers, Houston, TX, Oct. 2–May 1988. SPE 18214, pp. 349–359.

* cited by examiner

Primary Examiner—Philip Tucker
(74) Attorney, Agent, or Firm—Philip C. Mendes da Costa; Bereskin & Parr

(57) ABSTRACT

A fracturing fluid is disclosed consisting of an emulsion having a continuous phase of a liquified gas, a discontinuous phase of a hydrocarbon, and a surfactant soluble in the two phases. The surfactant is preferably a hydrofluoroether.

5 Claims, 2 Drawing Sheets

LIQUID CO₂/HYDROCARBON OIL EMULSION FRACTURING SYSTEM

FIELD OF THE INVENTION

The present invention relates to a novel formulation for a fracturing fluid for use in fracturing subterranean formations such as oil and gas wells.

BACKGROUND OF THE INVENTION

It is known to utilize an emulsion consisting of water or water with a polymer therein as the continuous phase, and from about 50% to about 80% oil (crude or refined) as the discontinuous phase, with a surfactant such as sodium tallate or a quaternary amine in the aqueous phase. This is shown in Polymer Emulsion Fracturing (Sinclair et al), a 1973 publication of the Society of Petroleum Engineers. It is also known, as shown in U.S. Pat. No. 4,233,165, to utilize a water-in-oil emulsion as a fracturing fluid. In that case, a surfactant soluble in oil is utilized to maintain an aqueous internal phase in a continuous diesel phase.

Moreover, stable foams have been developed where the external phase is water and the internal phase is $CO_2$ and the foam is stabilized by selective chemical foamers. It has been found that the internal phase ($CO_2$) in such foam has to be a minimum of 53%. The Western Company of North America has developed two foams, the first one where a combination of $CO_2$ and Nitrogen is used to create a stable foam with the addition of chemical foamers. The combined internal phase of gas is still over 52% by volume. The second foam involves stabilizing the $CO_2$ foam with a crosslinker without the use of foamer. By using less $CO_2$ the produced gas from a well can be put on a pipe-line faster without flaring for a long time to meet pipeline $CO_2$ content regulations. Moreover, all the above systems use gelling agents from guar to CMHPG to stabilize the foams. There have also been attempts made to foam $CO_2$ in diesel or crudes with limited success because of the natural antifoam ability of these oils.

Conventionally, instead oil gels have been used. However, with the potential for downstream problems of the phosphate esters used in gelling oils, there is a need for alternatives. Attempts have been made to pump $CO_2$ with gelled oils, mainly to use the energy of the phase change from liquid to $CO_2$ gas to clean up wells efficiently. However, most phosphate ester based oil gels are not compatible with $CO_2$; when these systems are made to survive under $CO_2$ conditions, breaking with conventional breakers for these systems, which tend to be high pH buffers tend to be neutralized by the $CO_2$ or in the presence of any water, will chelate the aluminum or iron crosslinkers (complexers) and cause precipitation resulting in formation change.

The approach of the present invention is to provide an emulsion of oil in liquid $CO_2$. This is possible with the selection of an appropriate surfactant, in particular methoxy- or ethoxy nonafluorobutane. This approach provides an emulsion of high sustained permeability, without the need or gelling and breaking, and the costs associated therewith. The amount of $CO_2$ required is less than 48%, which results in cost effectiveness, and the inherent ability of $CO_2$ simply to gasify and escape to the atmosphere indicates simplified clean-up after fracturing.

The object of the present invention, is to provide a fracturing fluid consisting of an emulsion of hydrocarbon in a liquified gas such as liquid $CO_2$.

A further object of the present invention is to provide an emulsion of liquid $CO_2$ in which is dissolved a surfactant, and in which are suspended droplets of a hydrocarbon fluid, for use in fracturing oil and/or gas well formations.

In a broad aspect, then, the present invention relates to a fracturing fluid consisting of an emulsion having a continuous phase of a liquified gas, a discontinuous phase of a hydrocarbon, and a surfactant soluble in the two phases.

BRIEF DESCRIPTION OF THE DRAWINGS

The present invention will be described by way of example below, and in connection with the description the following drawings are provided.

DETAILED DESCRIPTION

In order to determine the solubility of $CO_2$ with two candidate hydrocarbons, labstock diesel and Frac Oil 200™ (a hydrocarbon based fracturing oil from Amoco Canada Petroleum Company Ltd., Calgary, Alberta) the following test was conducted.

Solubility

The tests were conducted with labstock diesel and Frac Oil 200. The volumes were visual within a sight glass of a known volume. Due to the small volume in the sight glass (75 mL) weight %, was not used. 25 mL of hydrocarbon was added to the cell at −20° C., $CO_2$ was added until total volume was 75 mL (50 mL of $CO_2$). Pressure in the cell was 500 psi for the diesel and 700 psi for the Frac Oil 200. The cell was then observed at various temperatures to see the volume changes in hydrocarbon and $CO_2$.

Figure 1:
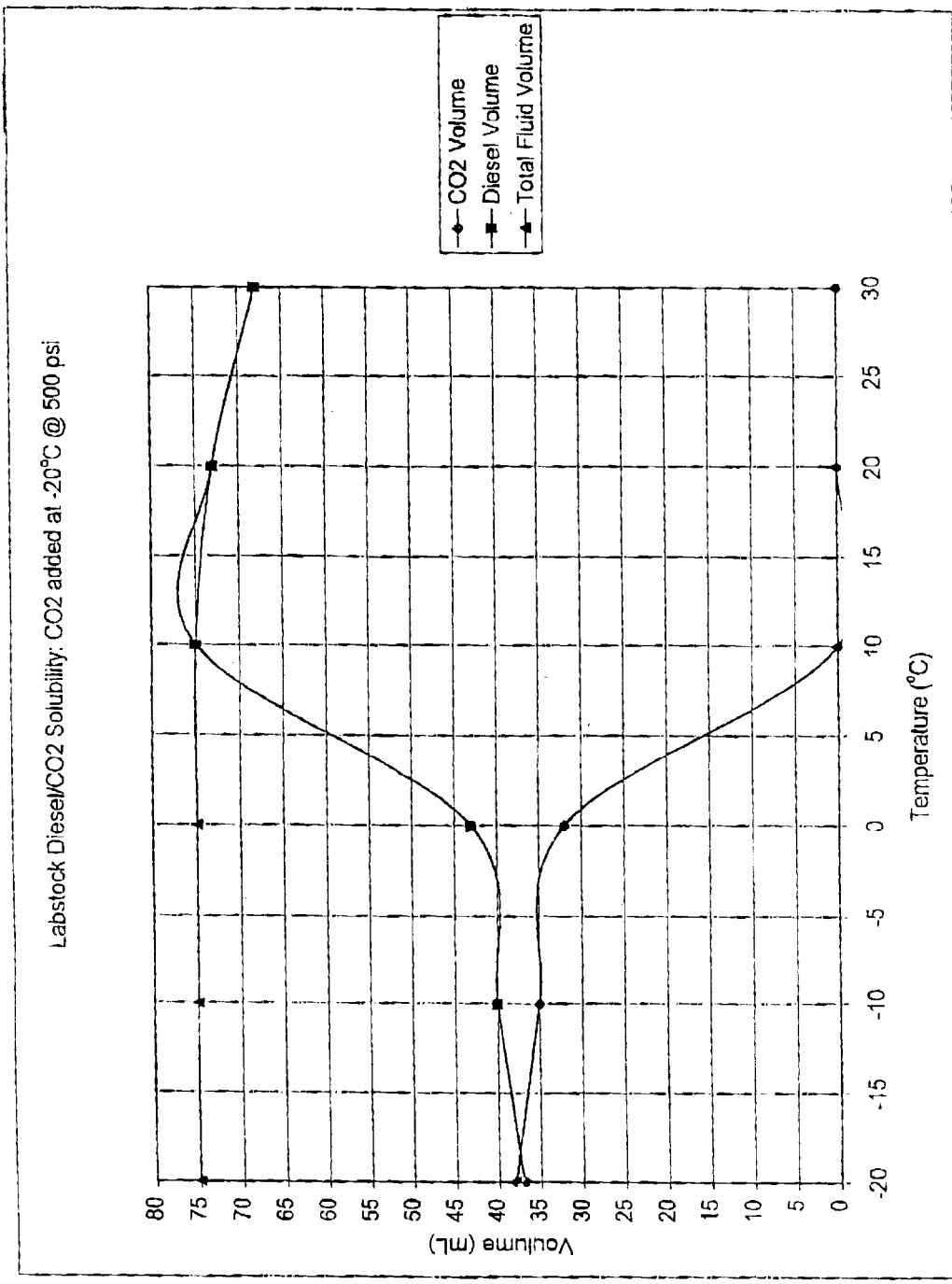
FIG. 1 is a graph of Diesel/$CO_2$ solubility.
Figure 2:
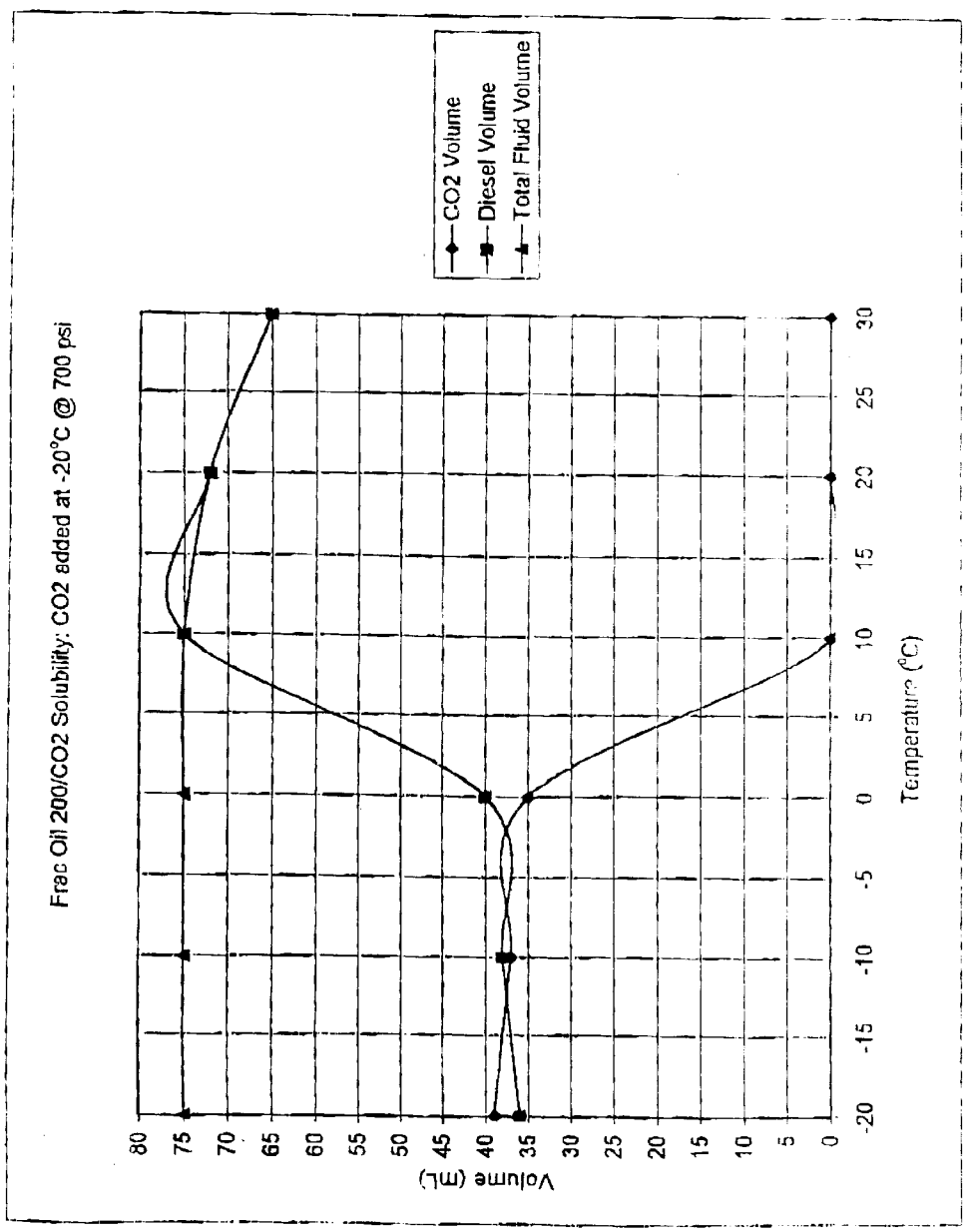
FIG. 2 is a graph of Frac Oil 200/$CO_2$ solubility.

The observed results are shown in FIGS. 1 and 2.

The volume change could be caused by a number of factors: $CO_2$ volume increases with lower temperature and the solubility of $CO_2$ in hydrocarbon decreases with lower temperature. The volume of the hydrocarbons both increased about the same, 25 mL to 36–38 mL, indicating both the fluids had similar $CO_2$ solubility. Both fluids match up well in solubility and volume changes at the various temperatures. The pressure of the cell in both tests did not increase until the temperature was 10° C. and vapor was created. When the vapor is created then the fluid changes from a polyemulsion into a $CO_2$ foam. However, since the volume of $CO_2$ may not be above 53 quality, there will be little viscosity to this foam. If the pressure exceeds 500 psi at −20° C. the emulsion will be formed until the temperature increases to 5–10° C. or enough pressure is applied to keep the $CO_2$ in a liquid phase.

The emulsions of the present invention were then created, using labstock diesel, liquid $CO_2$ and hydrofluoroether surfactant HFE 7200 and HFE 7100 from 3M Chemicals. HFE 7200 ($C_4F_9OC_2H_5$) consists of two inseparable isomers with essentially identical properties. These are $(CF_3)_2CFCF_2OC_2H_5$ (CAS No. 163702-06-5) and $CF_3CF_2CF_2CF_2H_5$ (CAS No. 163702-05-4). HFE-7100 ($C_4F_9OCH_3$) consists of two inseparable isomers with essentially identical properties. These are $(CF_3)_2CFCF_2OCH_3$ (CAS No. 163702-08-7) and $CF_3CF_2CF_2CF_2OCH_3$ (CAS No. 163702-07-6). Both surfactant are soluble in liquid $CO_2$ and diesel, and both produced similar results.

The surfactant is added at a rate of from about 1 to 30, preferably about 4 L/m³ to diesel. The diesel/surfactant solution is then mixed with liquid $CO_2$ at a rate of about 5%–48% $CO_2$, preferably ;about 30–40% $CO_2$. The mixture is then vigorously agitated or subject to shear, resulting in a stable emulsion (stability increasing with shear), with appropriate viscosity for use as a fracturing fluid.

What is claimed is:

1. A method of fracturing a formation comprising:
   (a) providing a fracturing fluid comprising comprising an emulsion having a continuous phase of liquified $CO_2$, a discontinuous phase of a hydrocarbon and a surfactant soluble in the two phases; and,
   (b) pumping the fracturing fluid into the formation whereby the formation is fractured.

2. A method as claimed in claim 1, further comprising selecting the surfactant from the group consisting of $C_4F_9OC_2H_5$, comprising the isomers $(CF_3)_2CFCF_2OC_2H_5$ and $CF_3CF_2CF_2CF_2H_5$ and $C_4F_9OCH_3$, comprising the isomers $(CF_3)_2CFCF_2OCH_3$ and $CF_3CF_2CF_2CF_2OCH_3$.

3. A method as claimed in claim 2, wherein the hydrocarbon is diesel fuel and the surfactant is present in the diesel fuel and the method further comprises providing the surfactant in an amount from 1 to 30 liters per cubic meter.

4. A method as claimed in claim 3, further comprising mixing the diesel/surfactant with the $CO_2$ in a ratio of 95% to 52% of the diesel/surfactant and 5% to 48% of the $CO_2$.

5. A method as claimed in claim 3, further comprising mixing 4 liters of surfactant per cubic meter of diesel to prepare the diesel/surfactant solution, and mixing the diesel/surfactant with the $CO_2$ in a ratio of 60% to 70% of the diesel/surfactant and 30% to 40% of the $CO_2$.

* * * * *